United States Patent [19]

Bach

[11] Patent Number: 5,028,371

[45] Date of Patent: Jul. 2, 1991

[54] CORRUGATED METAL-CLAD SANDWICH PANEL WITH A WAFER COMPOSITE CORE

[75] Inventor: Lars Bach, Edmonton, Canada

[73] Assignee: Alberta Research Council, Edmonton, Canada

[21] Appl. No.: 587,383

[22] Filed: Sep. 25, 1990

[30] Foreign Application Priority Data

Sep. 25, 1989 [CA] Canada .................................. 613070

[51] Int. Cl.$^5$ ............................................. B32B 31/20
[52] U.S. Cl. ................................... 264/112; 156/62.2;
156/196; 156/219; 264/118; 264/119; 264/120;
264/294
[58] Field of Search ............... 264/112, 118, 119, 120,
264/294; 156/62.2, 196, 219, 296; 29/897.32

[56] References Cited

U.S. PATENT DOCUMENTS

| | | | |
|---|---|---|---|
| 3,998,573 | 12/1976 | Gilbert et al. | 425/117 |
| 4,061,813 | 12/1977 | Geimer et al. | 428/183 |
| 4,504,347 | 3/1985 | Munk et al. | 156/245 |
| 4,616,991 | 10/1986 | Bach et al. | 425/396 |
| 4,675,138 | 6/1987 | Bach et al. | 264/294 |

Primary Examiner—Mary Lynn Theisen
Attorney, Agent, or Firm—Millen, White & Zelano

[57] ABSTRACT

A corrugated metal-clad sandwich panel with a wafer composite core is provided. The single stage process for the panel manufacture involves utilizing a press platen system which is mechanically convertible between a planar and a corrugated configuration. The metal sheet is first placed on the lower platen which is in the planar configuration. The wafers and an isocyanate resin in admixture are uniformly distributed over the metal sheet. Optionally, a second metal sheet is placed over the wafer/resin mat. The platens are converted from the planar to the corrugated configuration, thus forming the corrugated metal-clad sandwich panel having a waferboard core in a single stage.

8 Claims, No Drawings

CORRUGATED METAL-CLAD SANDWICH PANEL WITH A WAFER COMPOSITE CORE

FIELD OF THE INVENTION

The present invention relates to a corrugated metal-clad sandwich panel with a wafer composite core and to the process for making it.

BACKGROUND OF THE INVENTION

Typically, a wafer board panel comprises layers of wood flakes or wafers formed into a composite structure using a resinous binder. The preparation of wafer board panels is complex, but broadly consists of two principal stages. The first stage comprises the preparation of the wafers and the admixing thereof to form a loose layer or mat. The second stage involves subsequent compression and heating of the mat to cure the resin and form the consolidated panel.

Until recently, wafer board was manufactured in the form of planar or flat sheets. However, as disclosed in U.S. Pat. No. 4,616,991, the present applicant has developed an apparatus and process for the manufacture of panels having a wave-like or corrugated configuration. Such wave-board panels have improved structural strength properties, relative to planar panels.

This prior patented apparatus involved a pair of opposed, spaced-apart, upper and lower platens. Each platen was formed of adjacent lengths of chain-like links. When the lengths were pushed inwardly from the side, they would shift from a planar to an undulating corrugated form.

The process steps involved:

distributing a mat of loose wood wafers between the upper and lower platen surfaces while they were maintained in the planar configuration;

biasing the platens together to pre-compress the mat, and thereby substantially fixing the wafers together to limit their further relative movement;

converting the two platen surfaces, still in pressing association with the mat, from the planar to the corrugated configuration; and then applying additional pressure and heat for a sufficient time to cure the binder and produce a corrugated sandwich wave-board panel.

The main advantage inherent in the patented process was that the panel product so formed was characterized by having a substantially uniform density. This was achieved because the wafers were fixed by the pre-compression step and because the mat was not significantly stretched or elongated during the conversion from the planar to the corrugated configuration.

It would be an advantage if one could provide a corrugated metal-clad sandwich panel. By metal clad is meant with a metal sheet cohesive with the wafer board core on at least one face thereof. The metal-clad panel would find use in high moisture-exposure applications (i.e. roof sheeting or the like).

SUMMARY OF THE INVENTION

In accordance with the present invention, it has been found that a corrugated metal-clad sandwich wave-board panel may be manufactured in a single stage. The process involves the concept of:

utilizing corrugated platens like those described in the '991 patent i.e. platens which are mechanically convertible between a planar and a corrugated configuration;

placing the metal sheet to be used metal on the lower press platen;

distributing the mat of loose wood wafers in admixture with an isocyanate resin onto the overlay sheet;

optionally placing a second sheet of overlay over the mat;

biasing the platens together to pre-compress the mat substantially fixing the wafers so as to limit their relative movement and bringing the metal sheet into contact therewith;

converting the two platen surfaces, still in pressing association with the mat and the metal sheet, from the planar to the corrugated configuration so as to translate both the metal sheet and mat in combination in a single stage from the planar to the corrugated metal-clad form; and applying additional pressure (and optionally heat) so as to cure the binder and provide a cohesive corrugated metal-clad sandwich wave-board panel.

The process relies on the concepts of converting the metal sheet and mat in combination, in a single stage from the planar to the corrugated form. Further the process takes advantage of the affinity between isocyanate resins and metal which produces good adhesivity therebetween in the manufacture of a useful product.

In a first broad aspect, the invention is a corrugated metal-clad sandwich panel formed of a binder-coated wafer core subjected to binder curing and compression and a metal-cladding affixed to one face of the panel.

In a second broad aspect, the invention is a process for making a corrugated panel having a metal-cladding thereon which comprises: placing the metal sheet onto the press platen; distributing a mat of loose binder-coated wood wafers between the metal sheet and the upper press platen or optionally between two metal sheets, said platens being adapted to be mechanically actuated to move the surfaces together and when further required to be converted from the planar configuration to a wave-like configuration; biasing the platens together vertically to precompress the mat between the planar surfaces to substantially fix the wafers together to limit their further relative movement; converting the two platens and their platen surfaces still in pressing association with the mat and metal sheet from the planar to the corrugated configuration; and applying heat and additional pressure with the platen surfaces to the mat and metal sheet for a sufficient time to cure the binder and produce a corrugated sandwich wafer board panel having an metal-cladding thereover.

DESCRIPTION OF THE PREFERRED EMBODIMENT

The corrugated metal-clad sandwich panels with a wafer board core having a wave-like configuration were prepared using the process and platen system described in U.S. Pat. No. 4,616,991. As stated earlier, the platen system involved a pair of opposed, spaced-apart upper and lower platens. Each platen was formed of adjacent lengths of chain-like links. Upon application of a lateral force thereto, the link assembly would move from a planar to a corrugated form. The final outside dimensions of the prepared panels were 24"×36", the skin thickness was approximately 11.3 mm (7/16"), and the panel depth wave peak to bottom was 63.5 mm (2½"). Additionally, it can be appreciated that the final panel size can be scaled up to 1220 ×4880 mm (4'×16').

Boards having panel densities from 647 kg/m³ up to 768 kg/m³ were prepared.

The process for preparing the corrugated metal-clad sandwich wafer board comprised the following steps.

The furnish could be prepared using various wood species. Aspen logs approximately 8' in length and 6"-1" in diameter were used. The logs were cleaned, debarked, waferized and screened. The strand or wafer length averaged 76 mm (3") and the thickness was about 0.76 mm (0.03"), however other strand or wafer geometrics can be used.

The moisture content of the furnish was reduced from the green state to about 5% to 10% using commercial dryers. The wafer was screened following drying.

At 5% moisture content, the furnish was blended with 2% by weight of isocyanate resin and 1% by weight wax in a laboratory drum blender.

Resin was utilized as a binder for the wafers and to adhere the metal overlay to the wafer board core.

The wax and wax/resin in admixture were arranged loosely by hand onto the metal sheet which had been positioned on the lower platen. The quantity of wafers and resin used were sufficient to produce a board having the requisite density.

The metal sheets could comprise aluminum, aluminum alloys or copper. The thickness of the sheet would preferably range from between about 0.5 mm to about 2 mm.

In the press, the mat and overlay sheet were subjected simultaneously to high temperature, which set the binder, and to high pressure which compressed the mat to specified thickness, and into adhesive engagement with the metal sheet. More particularly, the corrugated platen temperature was maintained at 205° C. The platen was heated by electrically heated rods extending within the press platens.

The open or fully extended surface area of the platens was 920 ×920 mm.

To obtain pre-compression and corrugation the press was operated in a manual control mode. Once the mat and metal sheet were in place on the platens, a vertical pre-compression force of less than $3.4 \times 10^6$ Newtons were applied. Application of this force brought the top and bottom platens towards one another. At this displacement, the platens were, following pre-compression, actuated into the corrugated configuration by application of a horizontal side force of less than $0.52 \times 10^6$ Newtons thereto.

A final compression was applied by bringing the press platens closer together, until the latter reached their stops. The panel was retained between the press platens for several minutes to allow the resin to set.

Prior to removal of the finished wafer board panel from the press, the pressure was released slowly to avoid steam release damage.

The panels were then cooled.

The embodiments of the invention in which an exclusive property or privilege is claimed are defined as follows:

1. A process for making a corrugated sandwich wafer board panel having a metal-cladding thereon which comprises:

placing a metal sheet onto a lower press platen;

distributing a mat of loose binder-coated wood wafers between the metal sheet and an upper press platen or optionally between two metal sheets,; biasing the platens together vertically to precompress the mat between planar surfaces to substantially fix resultant wafers together to limit their further relative movement; and converting the two platens and their platen surfaces still in pressing association with the mat and the metal sheet, form a planar to a corrugated configuration; and applying heat and additional pressure with the platen surfaces to the mat and metal sheet for a sufficient time to cure the binder and produce a corrugated sandwich wafer board panel having a metal-cladding thereover.

2. A process according to claim 1, wherein said converting to a corrugated configuration is conducted by applying a horizontal side force to the platens.

3. A process according to claim 1, wherein said metal sheet has a thickness below about 2 mm and said binder comprises an isocyanate resin.

4. A process according to claim 2, wherein said metal sheet has a thickness below about 2 mm and said binder comprises an isocyanate resin.

5. A process according to claim 1, wherein said metal is selected from the group comprising aluminum, aluminum alloys or copper.

6. A process according to claim 2, wherein said metal is selected from the group comprising aluminum, aluminum alloys or copper.

7. A process according to claim 3, wherein said metal is selected from the group comprising aluminum, aluminum alloys or copper.

8. A process according to claim 4, wherein said metal is selected from the group comprising aluminum, aluminum alloys or copper.

* * * * *